United States Patent Office 3,435,074
Patented Mar. 25, 1969

3,435,074
PROCESS FOR PRODUCING NITRODIARYLAMINES
Shinichiro Terao, Ashiya-shi, Seizi Sagawa, Hirakata-shi, and Seizo Yabuta, Nishinomiya-shi, Japan, assignors to Sumitomo Chemical Company, Ltd., Osaka, Japan, a corporation of Japan
No Drawing. Filed May 20, 1965, Ser. No. 457,482
Claims priority, application Japan, May 22, 1964, 39/28,919
Int. Cl. C07c 79/12
U.S. Cl. 260—576
6 Claims

ABSTRACT OF THE DISCLOSURE

Nitrodiphenylamines are produced by condensing at a reduced pressure and at a temperature of 100–300° C. a halogenated nitrophenyl compound and a phenylamine in the presence of a phenylamide such as formanilide, a dehydrohalogenating agent, and a neutralizing agent. The phenylamine reactant is distilled off with water during the course of the reaction, and after dehydration may be recycled to the condensing step.

---

This invention relates to a process for producing nitrodiarylamines. More particularly, it relates to a process for producing nitrodiarylamines by condensing a halogenated nitroaryl compound with an arylamine.

Nitrodiarylamines, particularly p-nitrodiphenylamine and p-nitro-p'-methyldiphenylamine are very useful as intermediates for producing dyes and rubber chemicals.

The methods of synthesizing nitrodiphenylamines have been investigated for many years and various processes are proposed. The processes so far proposed are not quite satisfactory from a technical point of view. Some take a long time for reaction when carried out in commercial scale, leading to increase of tarry by-products and decrease of yields; others need specific starting materials.

In the conventional condensation, a halogenated nitroaryl compound and an arylamine are allowed to interact directly without using any particular solvent. In such case, the final products are exposed to inorganic alkali at high temperatures for a long time and are easily turned to a tarry substance.

It was proposed in the Japanese patent publication No. 16,621/1961 that nitrodiarylamines are produced by the reaction of a halogenated nitroaryl compound and 1.1 to 1.5 equivalents to the halogenated nitroaryl compound of an amide such as formanilide and acetanilide in the presence of a dehydrohalogenating catalyst and a neutralizing agent. However, the proposed method is not as yet satisfactory in the yield and the purity of the product.

The present inventors have found that addition of amides mentioned hereinafter greatly promotes the reaction between a halogenated nitroaryl compound and an arylamine when used in an amount ranging from 0.05 to 1 equivalent per equivalent of halogenated nitroaryl compounds and that in comercial scale process the reaction is much smoothly conducted by maintaining the reaction system at a reduced pressure, destilling off water generated out of the reaction zone together with the arylamine, dehydrating the distilled arylamine and recycling the dehydrated arylamine into the bottom of the reaction zone.

It is an object of the present invention to provide a new economical process for preparing nitrodiarylamines.

It is another object of the present invention to provide a process for preparing nitrodiarylamines using amide as a catalyst.

Other objects will be obvious from the descriptions hereinafter disclosed.

According to this invention, nitrodiarylamines may be efficiently produced by condensing a halogenated nitroaryl compound with an arylamine in the presence of a dehydrohalogenating catalyst of copper or nickel series, a neutralizing agent and an amide derivative.

The halogenated nitroaryl compounds employed are represented by the general formula of

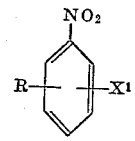

wherein R is a member selected from the group consisting of hydrogen atom and methyl radical, and $X^1$ is a member selected from the group consisting of chlorine, bromine and iodine atoms. The halogenated nitroaryl compounds include p-chloronitrobenzene, o-chloronitrobenzene, m-chloronitrobenzene, p-bromonitrobenzene, o-bromonitrobenzene, m-bromonitrobenzene, p-iodonitrobenzene, o-iodonitrobenzene, m-iodonitrobenzene, m-chloro-p-methyl-nitrobenzene, 2 - methyl - 5 - chloronitrobenzene and 2 - methyl - 3 - chloronitrobenzene. Among the above compounds, p-chloronitrobenzene is most preferable from the commercial point of view. The arylamine compounds employed are represented by the formula of

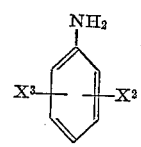

wherein $X^2$ and $X^3$ each represents a member selected from the group consisting of hydrogen atom, lower alkoxy radicals having 1 to 2 carbon atoms and nitro radical. The arylamine compounds include aniline, p-toluidine, o-toluidine, p-nitroaniline, m-nitroaniline, o-nitroaniline, p-anisidine, o-anisidine, p-ethylaniline, o-phenetidine, 2,4-xylidine, 2,6-xylidine and mixed xylidine.

Among the above compounds, aniline and p-toluidine are preferable from the commercial point of view. An amount ranging from 1.1 to 10, preferably from 1.1 to 3 equivalents per equivalent of the halogenated nitroaryl compound of the arylamine compound is employed.

The amide compound is obtained by the reaction of the arylamine compound employed in the process of the present invention and a member of formic acid, acetic acid and propionic acid. In the case of using aniline, for example, formanilide, acetanilide and propioanilide are exemplified. Among those compounds, formanilide and acetanilide compounds are preferred from the commercial point of view. An amount ranging from 0.05 to 1.0 preferably from 0.1 to 0.6 equivalent per equivalent of the halogenated nitroaryl compound of the amide compound is employed. The above described aromatic amide compounds may be represented by the formula

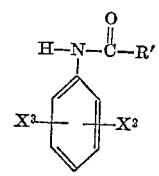

wherein $X^2$ and $X^3$ have the above given meanings and R' is a member selected from the group consisting of hydrogen, methyl and ethyl.

The neutralizing agents include, for example sodium hydroxide, potassium hydroxide, sodium bicarbonate, potassium bicarbonate, sodium carbonate and potassium carbonate. Among the above compounds potassium salts are preferable, especially anhydrous potassium carbonate, because the carbonate gives the product in higher purity and yield than the case using others. About 1.1 equivalent amount per equivalent of the halogenated nitroaryl compound of the neutralizing agent is employed.

The dehydrohalogenating catalyst includes for example copper compound such as copper powder, cuprous iodide, cupric iodide, cuprous chloride, cupric chloride, cuprous oxide, cupric oxide, basic copper carbonate, cupric sulfate, cuprous cyanide, cupric cyanide, cupric nitrate, cupric formate, cupric acetate and cupric stearate, and nickel compound such as nickel iodide, nickel chloride, nickel sulfate, nickel nitrate, nickel cyanide, nickel formate, nickel acetate and nickel stearate. Among those compounds cupric oxide is more preferable.

In the process of the present invention, an inert solvent, such as xylene, toluene, tetrahydronaphthalene and dimethylnaphthalene, may be used if desired.

The starting materials are charged into a reaction vessel and heated at a temperature of from 100° to 300° C., preferably from 170° to 230° C. The reaction zone is kept at a reduced pressure. 100 mm. to 600 mm. Hg is preferable. Dehydration takes place at the specified temperature and water is distilled off at a rate of about from 0.1 to 0.2 mol per hour per mol of the halogenated nitroaryl compound. The arylamine is also distilled off being accompanied with the water. The reaction is effected, in general, for 5–10 hours.

The reaction vessel is equipped with a vacuum pump, a dehydrating tower, a cooler, a separator and an evaporator. The arylamine distilled together with water is dehydrated in the dehydrating tower and the dehydrated arylamine is vaporized in the evaporator and recycled into the bottom of the reaction vessel. The water removed from the dehydrating tower is cooled in the cooler and then fed to the separator wherein the remaining arylamine is recovered and returned to the top of the tower.

The recycling of the dehydrated arylamine improves the prior process in that the water generated during the course of the reaction is removed from the reaction zone at a rate about twice as much as that attained by the prior process. The reaction time is reduced to about a half, and the content of tarry by-products is lowered, thereby the yield of the desired products is improved. In the commercial scale production, the reaction time may be reduced from the period of 12 to 18 hours in the prior art to the period of 5 to 10 hours and yield and purity may be improved to a value higher than 90%. The amount of arylamine to be recycled to the reaction zone after dehydration is adjusted to from 0.1 to 5.0 mol./hr., more preferably from 0.5 to 2.0 mol./hr. per mol of the halogenated nitroaryl compound. The recycling of the arylamine into the bottom of the reaction vessel may be called blowing. The blowing of the dehydrated arylamine serves for the expulsion of the water formed during the reaction out of the reaction vessel. Furthermore, the conditions of the reaction may be easily reproduced by regulating the amount of arylamine vaporized and recycled into the reactor, even if the scale of reaction should be enlarged.

After the reaction, the reaction mixture is poured into water for removing inorganic salts and oil layer is separated from water layer. The oil layer is filtered to remove residual catalyst and then either steam distilled or vacuum distilled for removing unreacted starting materials. The amide and the excess arylamine recovered after the end of the reaction may be used repeatedly.

Similarly favourable results may be obtained in an alternative method wherein the starting materials are not charged into a reactor at the same time, but instead of adding the arylamide an arylamine is first introduced together with an acid necessary for converting the arylamine into the corresponding amide, heated several hours and thereafter the halogenated nitroaryl compound, dehydrohalogenating catalyst and neutralizing agent are added for allowing the reaction to proceed.

The process of the present invention will be explained in further details with reference to the following specific examples, which are given merely by way of illustration and not by way of limitation.

Example 1

To a reaction vessel are charged 402 kg. of p-chloronitrobenzene, 356 kg. of aniline, 103 kg. of acetanilide, 176 kg. of anhydrous potassium carbonate and 5 kg. of cupric oxide. Then the mixture in the reaction vessel is agitated at 140 r.p.m., at a temperature of from 184° to 188° C. and under a reduced pressure of from 600 mm. to 350 mm. Hg regulated so as to evaporate aqueous aniline at a rate of 5 kg./min. Although a slight reduction in pressure is sufficient at an early stage of the reaction because of the existence of a large amount of aniline, the pressure must be gradually reduced along with the advance of the reaction, since the boiling point of the reaction mixture rises with decrease of aniline and formation of p-nitrodiphenylamine.

On the other hand, the distilled aqueous aniline is dehydrated in a dehydrating tower, fed to a vaporizer from the bottom of the tower through a metering pump, converted into vapor therein and again introduced to the bottom of the reaction vessel. Water coming out of the top of the dehydrating tower as an azeotropic mixture is condensed and separated from some remaining aniline in a separator and discarded, while the separated aniline is recycled to the dehydrating tower.

The reaction is continued in that way for about 7 hours until the water taken out of the reaction zone accumulates to about 22.2 kg. Then the content of the reaction vessel is cooled to about 120° C., poured into about 1500 kg. of water for dissolving and removing inorganic salts and then separated from the water layer. An oil layer thus obtained is filtered to remove residual catalyst, distilled to remove fraction up to 190° C./5 mm. Hg and 510 kg. of p-nitrodiphenylamine is obtained as a residue containing 2.5% of tarry mater as measured by a distillation.

On the other hand, the recovered fraction is analyzed on its composition and again used.

Example 2

To a reaction vessel are charged 201 kg. of p-chloronitrobenzene, 205 kg of p-toluidine, 57 kg. of p-methylacetanilide, 88 kg. of anhydrous potassium carbonate and 2.5 kg. of cupric oxide, and thereafter treated in the similar way as described in Example 1. The product is 289 kg. of p-methyl-p'-nitrodiphenyl amine, containing 3.0% of tarry matter.

Example 3

In a reaction vessel, a mixture of 214 kg. of aniline and 23 kg. of glacial acetic acid is refluxed by heating. After about 7 kg. of water is collected from the top of a dehydrating tower by distillation, 201 kg. of p-chloronitrobenzene, 88 kg. of anhydrous potassium carbonate and 2.5 kg. of cupric oxide are charged and operated in the similar way as described in Example 1. After 11.1 kg. of water has been additionally collected by distillation, the content in the reaction vessel is cooled to about 100° C., inorganic salts and residual catalysts are removed by filtration and the solid material is washed with acetone. The filtrate and the washings are combined and distilled in vacuo, the distillate up to 190° C./5 mm. Hg is recovered therefrom and 264 kg. of p-nitrodiphenylamine is obtained as a residue in the distillation vessel. The product contains 4.5% of tarry matter by distillation test.

What we claim is:

1. A process for producing nitrodiphenylamines which comprises condensing at a reduced pressure and at a temperature of about 100–300° C. a halogenated nitrophenyl compound having the formula

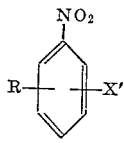

wherein R is a member selected from the group consisting of hydrogen and methyl and X' is a member selected from the group consisting of chlorine, bromine and iodine, with a phenylamine having the formula

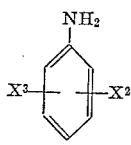

wherein $X^2$ and $X^3$ each represents a member selected from the group consisting of hydrogen, lower alkoxy having 1 to 2 carbon atoms, and a nitro radical, in the presence of a dehydrohalogenating agent, a neutralizing agent, and 0.05 to 1.0 equivalent per equivalent of the halogenated nitrophenyl compound of a phenylamide of the formula

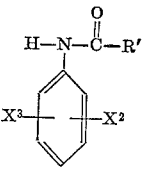

where $X^2$ and $X^3$ have the above given meanings and R' is a member selected from the group consisting of hydrogen, methyl and ethyl, distilling off water together with some of said phenylamine from the reaction mixture, dehydrating the distilled phenylamine, and recycling the dehydrated phenylamine to the reaction mixture of the condensing step.

2. A process according to claim 1, wherein the amount of recycled phenylamine is from 0.1 to 5.0 mol/hr. per mol of the halogenated nitrophenyl compound.

3. A process according to claim 1, wherein the condensation is conducted under a pressure of from 100 mm. to 600 mm. Hg.

4. A process according to claim 1, wherein the condensation is conducted for 5 to 10 hours.

5. A process according to claim 1, wherein the halogenated nitrophenyl compound is p-chloronitrobenzene.

6. A process according to claim 1, wherein the phenylamine is aniline.

References Cited

FOREIGN PATENTS 614,158   2/1961   Canada.

CHARLES B. PARKER, *Primary Examiner.*

PATRICIA C. IVES, *Assistant Examiner.*